3,125,590
6-METHYL-$\Delta^{4,6,9(11)}$-PREGNATRIENES AND
DERIVATIVES THEREOF
Howard J. Ringold, Mexico City, Mexico, assignor, by mesne assignments, to Syntex Corporation, a corporation of Panama
No Drawing. Filed Apr. 6, 1960, Ser. No. 20,242
Claims priority, application Mexico June 1, 1959
6 Claims. (Cl. 260—397.45)

The present invention relates to novel cyclopentanophenanthrene derivatives and to a process for the production thereof.

More particularly the invention relates to 6-methyl derivatives of 1-dehydro, 6-dehydro and 1,6-bis-dehydro-17α-acyloxy - $\Delta^4$ - pregnene-3,20-diones having an 11β-hydroxy or 11-keto and a 9α-halo group or having further unsaturation in ring C between C–9 and C–11.

The novel compounds of the present invention are agents showing a marked progestational as well as anti-estrogenic activity.

The novel compounds of the present invention may be illustrated by the following formulae:

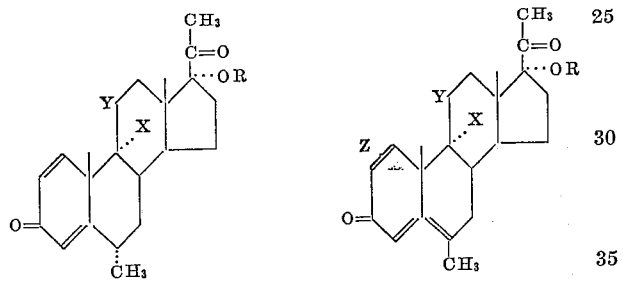

In the above formulae Y represents keto or β-hydroxy; X represents halogen such as fluorine, chlorine, bromine or iodine; Z indicates a double bond between C–1 and C–2 or a saturated linkage between C–1 and C–2. R represents an acyl group derived from hydrocarbon carboxylic acids of up to 12 carbon atoms, saturated or unsaturated, of straight or branched chain, cyclic or cyclic-aliphatic, which may be substituted by functional groups such as hydroxyl, acyloxy of up to 12 carbon atoms, alkoxy of up to 8 carbon atoms, amino or halogen such as fluorine, chlorine or bromine. Typical ester groups are the acetate, propionate, butyrate, hemisuccinate, enanthate, caproate, benzoate, aminoacetate, trimethylacetate, phenoxyacetate, phenylpropionate and β-chloro-propionate.

The novel compounds of the present invention may be prepared by a process illustrated in part by the following equation:

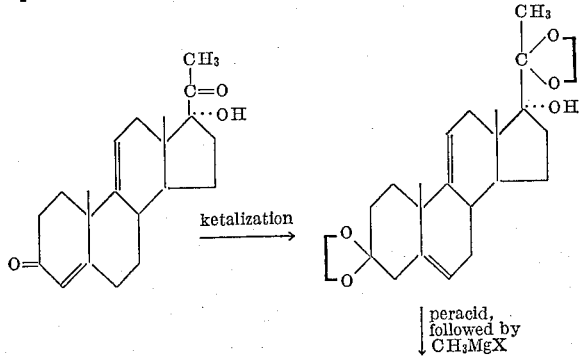

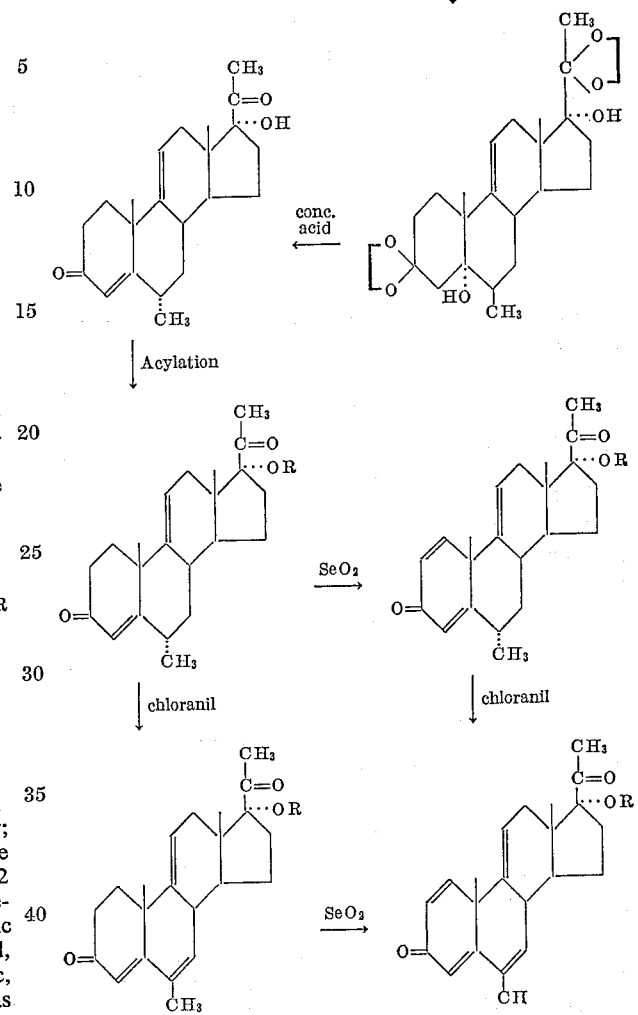

In the above equation, R has the same meaning as heretofore set forth.

In practicing the process outlined above, $\Delta^4$-pregnene-11,17α - diol - 3,20 - dione is dehydrated by heating with mesyl chloride in dimethylformamide-pyridine to form $\Delta^{4,9(11)}$-pregnadien-17α-ol-3,20-dione which is then treated with ethylene glycol in the presence of an acid catalyst such as p-toluenesulfonic acid to form the corresponding, 3,20-bis-cycloethylene-ketal with a concomitant shift of the C–4(5) double bond to C–5(6). The 5(6) double bond is oxidized with a peracid, preferably an aromatic peracid such as monoperphthalic or perbenzonic acid to form the corresponding 5α,6α-oxido compound. Treatment of the oxido compound with methyl magnesium bromide gives the 6β-methyl-3,20-bis-ethylenedioxy-$\Delta^{9(11)}$-pregnene-5α,17α-diol compound which upon further treatment with acid such as concentrated hydrochloric acid in acetic acid at room temperature for about 24 hours, results in the hydroylsis of the ketal groups and introduction of the C–4(5) double bond by dehydration with inversion of the steric configuration at C–6 to produce 6α-methyl-$\Delta^{4,9(11)}$-pregnadien - 17α - ol - 3,20-dione in one step.

The C–17α-hydroxyl group is then esterified as by treatment with a hydrocarbon carboxylic acid anhydride or chloride of less than 12 carbon atoms in the presence of p-toluenesulfonic acid and optionally in an inert solvent such as benzene. For the preferential preparation of the acetate, acetic anhydride in acetic acid in the presence of p-toluenesulfonic acid is utilized.

The thus formed 6α-methyl-17α-acyloxy-$\Delta^{4,9(11)}$-pregnadiene-3,20-dione can then be transformed into the novel 1-dehydro, 6-dehydro and 1,6-bis-dehydro derivatives. For introduction of a double bond between C–1 and C–2, the 6α-methyl-17α-acyloxy-$\Delta^{4,9(11)}$-pregnadiene-3,20-dione is refluxed with selenium dioxide in tertiary butanol and catalytic amounts of pyridine. The 6-dehydro derivatives of 6α-methyl-17α-acyloxy-$\Delta^{4,9(11)}$-pregnadiene - 3,20-dione is obtained by refluxing the latter with chloranil in admixture with ethyl acetate and acetic acid, or with xylene. The 1,6-bis-dehydro derivative of 6α-methyl-17α-acyloxy-$\Delta^{4,9(11)}$-pregnadiene-3,20-dione is obtained either by refluxing the 1-dehydro derivative with chloranil in n-amyl alcohol or by refluxing the 6-dehydro derivative with selenium dioxide to afford 6-methyl-17α-acyloxy-$\Delta^{1,4,6,9(11)}$-pregnatetraene-3,20-dione.

The 1-dehydro, 6-dehydro or 1,6-bis-dehydro derivatives of 6α-methyl-17α-acyloxy-$\Delta^{4,9(11)}$-pregnadiene-3,20-dione are then subjected to the method described by Fried et al., J. Am. Chem. Soc. 79, 1130 (1957) for introduction of halogen at C–9α and a hydroxyl group at C–11 which method entails treatment of the aforementioned compounds with a reagent capable of generating hypobromous acid such as a N-bromoimide or N-bromoamide or the hypobromite of an alkali or alkali-earth metal, preferable N-bromoacetamide and aqueous perchloric acid in dioxane to produce the bromohydrin. The latter is refluxed with potassium acetate in dioxane-methanol to form the 9β,11β-oxido compound. By reaction with hydrogen fluoride, hydrogen chloride or hydrogen iodide in an inert solvent such as chloroform or a mixture of tetrahydrofuran and methylene chloride under anhydrous conditions and low temperature there is obtained the corresponding fluoro, chloro or iodohydrins, namely, 6α-methyl-9α-fluoro-17α-acyloxy-$\Delta^{1,4}$-pregnadien-11β-ol-3,20-dione; 6-methyl-9α-fluoro-17α-acyloxy-$\Delta^{4,6}$-pregnadien-11β-ol-3,20-dione; 6-methyl-9α-fluoro-17α-acyloxy-$\Delta^{1,4,6}$-pregnatrien-11β-ol - 3,20 - dione and the corresponding 9α-iodo and 9α-chloro compounds.

By oxidation of the hydroxyl group at C–11 with chromic acid in dilute acetic acid or chromic acid in acetone, there is obtained 6α-methyl-9α-fluoro-17α-acyloxy-$\Delta^{1,4}$-pregnadiene-3,11,20-trione; 6-methyl-9α-fluoro-17α-acyloxy-$\Delta^{4,6}$-pregnadiene-3,11,20-trione; 6-methyl-9α,fluoro-17α-acyloxy-$\Delta^{1,4,6}$-pregnatriene-3,11,20-trione and the corresponding 9α-bromo, 9α-iodo, and 9α-chloro compounds.

Alternatively, the intermediate compound 6α-methyl-$\Delta^{4,9(11)}$-pregnadien-17α-ol-3,20-dione is prepared by transforming $\Delta^4$-pregnene-11α,17α-diol-3,20-dione into the corresponding 3,20-bis-cycloethylene ketal in the same manner as set forth previously; the double bond at C–5(6) is oxidized with a peracid and then reacted with a methyl Grignard agent to produce 6β-methyl-3,20-bis-ethylenedioxy-pregnane-5α,11α,17α-triol. Treatment with concentrated hydrochloric acid results in hydrolysis of the ketal groups, dehydration at C–5 and inversion of the steric configuration at C–6. By subsequent treatment with mesyl chloride in dimethylformamide-pyridine, there is obtained the 6α-methyl-$\Delta^{4,9(11)}$-pregnadien-17α-ol-3,20-dione.

The following examples serve to illustrate but are not intended to limit the present invention:

Example 1

10 g. of 11β,17α-dihydroxyprogesterone was dissolved with slight heating in a mixture of 140 cc. of dimethylformamide and 14 cc. of pyridine, cooled, treated with 5 g. of mesyl chloride and heated at 80° C. for half an hour. The cooled mixture was diluted with water, the precipitate was collected by filtration, washed with water, dried and recrystallized from acetone-hexane. There was thus obtained $\Delta^{4,9(11)}$-pregnadien-17α-ol-3,20-dione.

A mixture of 8 g. of the above compound, 500 cc. of benzene and 80 cc. of ethylene glycol was refluxed in the presence of 4 g. of p-toluenesulfonic acid monohydrate for 12 hours, with the use of a water separator. The mixture was cooled, treated with 80 cc. of 5% aqueous sodium carbonate solution and 500 cc. of water and the benzene layer was separated, washed with water, dried over anhydrous sodium sulfate and the benzene layer was evaporated. The residue, namely the 3,20-bis-ethylene-dioxy-$\Delta^{5,9(11)}$-pregnadien-17α-ol, was dissolved in 160 cc. of chloroform, treated with 100 cc. of ether containing 1.1 molar equivalents of monoperphthalic acid and the mixture was kept at room temperature and in the dark for 12 hours. The organic layer was then separated, washed with 5% aqueous sodium bicarbonate solution and then with water, dried over anhydrous sodium sulfate and the solvent was evaporated. Chromatography of the residue on neutral alumina afforded 3,20-bis-ethylenedioxy-5α,6α-oxido-$\Delta^{9(11)}$-pregnen-17α-ol.

A mixture of 6 g. of the above compound, 200 cc. of dry thiophene free benzene and 45 cc. of a 3 N ether solution of methyl magnesium bromide was refluxed for 6 hours. The mixture was then poured into 800 cc. of water and 800 g. of crushed ice containing 40 g. of ammonium chloride, under vigorous stirring; the organic layer was separated, washed with water, dried over anhydrous sodium sulfate and the solvent was evaporated. There was thus obtained 6β-methyl-3,20-bis-ethylenedioxy-$\Delta^{9(11)}$-pregnene-5α,17α-diol, which was treated with 200 cc. of acetic acid and 4 cc. of concentrated hydrochloric acid and kept at room temperature for 24 hours. After diluting with ice water the precipitate was collected, washed with water and purified by chromatography on neutral alumina. There was thus obtained 6α-methyl-$\Delta^{4,9(11)}$-pregnadien-17α-ol-3,20-dione.

A mixture of 5 g. of the above compound, 50 cc. of acetic anhydride, 250 cc. of glacial acetic acid and 5 g. of p-toluenesulfonic acid monohydrate was kept for two hours at room temperature. Most of the liquid was evaporated under reduced pressure in a bath at a temperature below 40° C. and the residue was diluted with water; the precipitate formed was collected, washed with water, dried and recrystallized from acetone-hexane, thus affording 6α-methyl-17α-acetoxy-$\Delta^{4,9(11)}$pregnadiene-3,20-dione.

A mixture of 2 g. of 6α-methyl-17α-acetoxy-$\Delta^{4,9(11)}$-pregnadiene-3,20-dione, 100 cc. of tertiary butanol, 1.5 g. of selenium dioxide was refluxed under an atmosphere of nitrogen for 48 hours, cooled, diluted with ethyl acetate and filtered through celite. The solvent was recovered by distillation under reduced pressure and the residue was triturated with water; the precipitate was collected, washed with water, dried and purified by chromatography on neutral alumina, thus giving 6α-methyl-17α-acetoxy-$\Delta^{1,4,9(11)}$-pregnatriene-3,20-dione. This compound showed marked activity in stimulating the central nervous system as well as progestational activity.

To a mixture of 5 g. of the above compound, 50 cc. of pure dioxane and 8 cc. of 0.4 N perchloric acid was added in the course of 1 hour, with continuous stirring, 3.1 g. of N-bromoacetamide, in the dark. The mixture was stirred for 1 hour longer, treated with 10% aqueous sodium sulfite solution until the starch-potassium iodide indicator paper no longer turned blue, then 400 g. of ice and 100 cc. of chloroform were added, and the organic layer was separated and successively washed with 5% aqueous sodium bicarbonate solution and water; the solution was evaporated under reduced pressure in a bath at a temperature below 25° C. and the residue was triturated with a little cold acetone. There was thus obtained 6α-methyl-9α - bromo-17α-acetoxy-1,4-pregnadien-11β-ol-3,20-dione. A small amount was purified by recrystallization from acetone at low temperature.

The above crude compound was dissolved in 20 cc. of dioxane and the solution was slowly added to a mixture of 3 g. of anhydrous potassium acetate and 35 cc. of absolute ethanol heated almost to boiling. The mixture was refluxed for 45 minutes, cooled, treated with 50 cc. of ice water under vigorous stirring and the precipitate was collected, washed with water and dried. There was thus obtained 6α - methyl - 17α - acetoxy - 9β,11β-oxido-$\Delta^{1,4}$-pregnadiene-3,20-dione, which was used for the next step without further purification.

The above crude product was dissolved in 100 cc. of methylene chloride, cooled to 0° C. and the solution was added to a mixture of 8 g. of anhydrous hydrogen fluoride and 15 cc. of tetrahydrofuran cooled in a Dry Ice-acetone bath, and placed in a polyethylene flask fitted with a magnetic stirrer. The addition was carried out little by little, with stirring and over a period of about 20 minutes; the mixture was then stirred at —10° for 6 hours further, neutralized by cautious addition of 5% aqueous sodium bicarbonate solution and transferred to a separatory funnel; the organic layer was washed with water, dried over anhydrous sodium sulfate and concentrated until a bulky precipitate separated. After cooling, the precipitate was collected, redissolved in 40 cc. of hot ethyl acetate, filtered while hot from insoluble material and the filtrate was cooled; thus there was obtained the crystalline 6α-methyl-9α-fluoro-17α-acetoxy-$\Delta^{1,4}$-pregnadien-11β-ol-3,20-dione.

A mixture of 500 mg. of the above compound, 1 g. of chloranil, 12.5 cc. of ethyl acetate and 2.5 cc. of glacial acetic acid was refluxed under an atmosphere of nitrogen for 55 hours. The cooled mixture was then washed with 5% aqueous sodium hydroxide solution until the washings were colorless, then with water to neutral, dried over anhydrous sodium sulfate and the solvent was evaporated under reduced pressure. By chromatography of the residue on neutral alumina, there was obtained 6-methyl - 9α-fluoro-17α-acetoxy-$\Delta^{1,4,6}$-pregnatrien-11β-ol-3,20-dione.

*Example 2*

A mixture of 500 mg. of 6α-methyl-17α-acetoxy-$\Delta^{1,4,9(11)}$-pregnatriene-3,20-dione prepared in accordance with the method of Example 1, 1 g. of chloranil and 10 cc. of n-amyl alcohol was refluxed for 18 hours under an atmosphere of nitrogen, cooled, diluted with water and extracted several times with methylene chloride; the extract was washed with 5% aqueous sodium hydroxide solution until the washings were colorless, then with water to neutral, dried over anhydroussodium sulfate and the solvent was evaporated; crystallization of the residue from acetone-hexane furnished 6-methyl-17α-acetoxy-$\Delta^{1,4,6,9(11)}$-pregnatetraene-3,20-dione. This compound also exhibited marked progestational and anti-estrogenic activity.

*Example 3*

A mixture of 1 g. of 6α-methyl-17α-acetoxy-$\Delta^{4,9(11)}$-pregnadiene-3,20-dione, 2 g. of chloranil, 25 cc. of ethyl acetate and 5 cc. of acetic acid was refluxed under an atmosphere of nitrogen for 55 hours. The mixture was cooled, washed with 5% aqueous sodium hydroxide solution until the washings were colorless, then with water, dried over anhydrous sodium sulfate and the solvent was evaporated. By chromatography of the residue on neutral alumina, there was obtained 6-methyl-17α-acetoxy-$\Delta^{4,6,9(11)}$-pregnatriene-3,20-dione.

1.0 g. of the above compound was refluxed with selenium dioxide in t-butanol and in the presence of pyridine, following the reaction conditions and procedure of isolation of Example 1, thus yielding 6-methyl-17α-acetoxy-$\Delta^{1,4,6,9(11)}$-pregnatetraene-3,20-dione.

*Example 4*

In accordance with the method described in Example 1, 6 - methyl - 17α - acetoxy-$\Delta^{1,4,6,9(11)}$-pregnatetraene-3,20-dione prepared in accordance with the method of Example 2 was transformed into 6-methyl-9α-bromo-17α-acetoxy-$\Delta^{1,4,6}$-pregnatrien-11β-ol-3,20-dione, then into 6-methyl - 9β,11β - oxido - 17α-acetoxy-$\Delta^{1,4,6}$-pregnatriene-3,20-dione and finally into 6-methyl-9α-fluoro-17α-acetoxy $\Delta^{1,4,6}$-pregnatriene-3,20-dione.

*Example 5*

In accordance with the method described in Example 1, 6 - methyl - 17α - acetoxy - $\Delta^{4,6,9(11)}$-pregnatriene-3,20-dione prepared in Example 3 was transformed into 6-methyl - 9α - bromo - 17α - acetoxy - $\Delta^{4,6}$-pregnadien-11β-ol-3,20-dione, then into 6-methyl-9β,11β-oxido-17α-acetoxy-$\Delta^{4,6}$-pregnadiene-3,20-dione and finally into 6-methyl-9α-fluoro-17α-acetoxy-$\Delta^{4,6}$-pregnadien-11β-ol-3,20-dione.

*Example 6*

In accordance with the method described in Example 1, there was prepared 4 g. of 6α-methyl-17α-acetoxy-9β,11β-oxido-$\Delta^{1,4}$-pregnadiene-3,20-dione which was dissolved in 40 cc. of pure chloroform, cooled to 0° C. and treated with 8 cc. of a 0.5 N solution of dry hydrogen chloride in chloroform, little by little, with stirring at 0° C. The mixture was stirred 1 hour further at 0° C., then diluted with water and the chloroform layer was separated, washed with water, 5% aqueous sodium carbonate solution and again with water. The chloroform solution was dried over anhydrous sodium sulfate and evaporated to dryness under reduced pressure. The residue crystallized from acetone to produce 6α-methyl-9α-chloro - 17α - acetoxy-$\Delta^{1,4}$-pregnadien-11β-ol-3,20-dione. By following the methods of dehydrogenation described in Examples 1 and 2, there was then obtained 6-methyl-9α - chloro - 17α - acetoxy - $\Delta^{1,4,6}$-pregnatrien-11β-ol-3, 20-dione.

*Example 7*

In accordance with the methods of dehydrogenation described in Examples 1 and 2, 6α-methyl-9α-bromo-17α-acetoxy-$\Delta^{1,4}$-pregnadien-11β-ol-3,20-dione was converted into the 6-methyl-6-dehydro compound.

*Example 8*

In accordance with the method described in Example 6, 6-methyl-9β,11β-oxido-17α-acetoxy-$\Delta^{4,6}$ - pregnadiene-3,20-dione, prepared in Example 5, was transformed into 6 - methyl-9α-chloro-17α-acetoxy-$\Delta^{4,6}$-pregnadiene - 3,20-dione.

By applying the method of dehydrogenation of Examples 1 or 3, there was obtained the 1-dehydro compound.

*Example 9*

A solution of 2 g. of 6α-methyl-17α-acetoxy-9β,11β-oxido-$\Delta^{1,4}$-pregnadiene-3,20-dione (Example 1) in 200 cc. of chloroform was cooled to —20° C. and treated with 4 cc. of a recently distilled solution of hydroiodic acid (55%). The mixture was vigorously stirred for 20 minutes, diluted with water and the organic layer was separated, washed with aqueous sodium sulfite solution and the chloroform was evaporated under reduced pressure, at room temperature. Recrystallization of the residue from ethyl acetate at a temperature below 40° C. afforded 6α - methyl-9α - iodo-17α-acetoxy-$\Delta^{1,4}$-pregnadiene-11β-ol-3,20-dione.

By subsequent dehydrogenation with chloranil as shown in Examples 1 and 2, there was further prepared the 6-dehydro derivative of 6α-methyl-9α-iodo-17α-acetoxy-$\Delta^{1,4}$-pregnadien-11β-ol-3,20-dione.

*Example 10*

In accordance with the method described in the previous example, 6-methyl-9β,11β-oxido-17α-acetoxy-$\Delta^{4,6}$- pregnadiene-3,20-dione was converted into 6-methyl-9α-iodo-17α-acetoxy-Δ⁴,⁶-pregnadiene-3,20-dione and finally into the 1-dehydro derivative thereof.

*Example 11*

In accordance with the method of Example 1, there was prepared 5 g. of 6α-methyl-9α-fluoro-17α-acetoxy-Δ⁴,⁶-pregnadien-11β-ol-3,20-dione, which was dissolved in 200 cc. of acetic acid and treated with 40 cc. of 50% acetic acid containing 1.5 g. of chromium trioxide. The oxidizing agent was added little by little, with stirring and maintaining the temperature around 15° C.; after stirring for 1 hour further the mixture was diluted with water and the precipitate was collected by filtration, washed with water, dried and recrystallized from acetone-hexane, thus furnishing 6α-methyl-9α-fluoro-17α-acetoxy-Δ¹,⁴-pregnadiene-3,11,20-trione. By subsequent dehydrogenation at C-6, 7 as in Example 2, there were obtained 6 - methyl - 9α-fluoro-17α-acetoxy-Δ¹,⁴,⁶ - pregnatriene-3,11,20-trione.

Similarly there were oxidized the 9α-bromo-and 9α-chloro-11β-hydroxy-17α-acetoxy derivatives, with or without additional double bonds at C-6, 7, to produce the corresponding 11-keto compounds.

*Example 12*

In accordance with the method of Example 11, 6-methyl-9α-fluoro-17α-acetoxy-Δ⁴,⁶ - pregnadien - 11β-ol-3,20-dione was converted into 6-methyl-9α-fluoro-17α-acetoxy-Δ⁴,⁶-pregnadiene-3,11,20-trione; 6-methyl-9α-bromo-17α-acetoxy-Δ⁴,⁶-pregnadien-11β-ol - 3,20-dione was converted into 6-methyl-9α-bromo-17α-acetoxy-Δ⁴,⁶-pregnadiene-3,11,20-trione; and 6-methyl-9α-chloro-17α-acetoxy-Δ⁴,⁶-pregnadien-11β-ol-3,20-dione was converted into 6 - methyl - 9α-chloro-17α-acetoxy-Δ⁴,⁶-pregnadiene-3,11,20-trione.

*Example 13*

In accordance with the method described in Example 1, there was prepared 5 g. of 6α-methyl-Δ⁴,⁹⁽¹¹⁾-pregnadien-17α-ol-3,20-dione, which was dissolved in 200 cc. of dry benzene, treated with 6 cc. of propionic anhydride and 2 g. of p-toluenesulfonic acid monohydrate; the mixture was kept at room temperature for 24 hours, diluted with water and the benzene layer was washed with 5% aqueous sodium bicarbonate solution and water, dried over anhydrous sodium sulfate and evaporated. Recrystallization of the residue from acetone-hexane yielded the propionate of 6α-methyl-Δ⁴,⁹⁽¹¹⁾-pregnadien-17α-ol-3,20-dione. The methods of dehydrogenation at C-1, 2, of halohydrin formation as well as of oxidation of the 11β-hydroxyl group to the keto group were then followed, and thus there were obtained the 17-propionates of the 9α-bromo, fluoro, chloro and iodo derivatives, respectively, of 6α-methyl-Δ¹,⁴-pregnadiene-11β,17α-diol-3,20-dione and of 6α-methyl-Δ¹,⁴-pregnadien-17α-ol-3,11,20-trione, and of 6-methyl-Δ¹,⁴,⁶-pregnatriene-11β,17α-diol-3,20-dione and of 6-methyl-Δ¹,⁴,⁶-pregnatrien-17α-ol-3,11,20-trione.

*Example 14*

In accordance with the method of Example 3, the 17-propionate of 6α-methyl-Δ⁴,⁹⁽¹¹⁾-pregnadien-17α-ol-3,20-dione was converted into the propionate of 6-methyl-Δ⁴,⁶,⁹⁽¹¹⁾-pregnatrien-17α-ol-3-one and then into the 17-propionates of the 9α-bromo, fluoro, chloro and iodo derivatives, respectively, of 6-methyl-Δ⁴,⁶ pregnadiene-11β,17α-diol-3,20-dione and of 6-methyl-Δ⁴,⁶-pregnadien-17α-ol-3,11,20-trione.

*Example 15*

In the method of Examples 13 and 14, the propionic anhydride was substituted by 10 g. of caproic anhydride and the reaction was allowed to proceed for 4 days. There were thus obtained the compounds set forth in such examples in the form of their 17-caproates.

I claim:
1. A compound of the following formula:

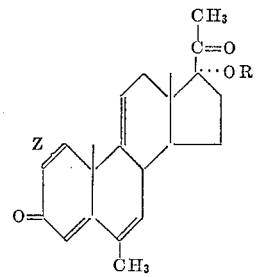

wherein R is a hydrocarbon carboxylic acyl group of less than 12 carbon atoms; and Z is selected from the group consisting of a double bond between C-1 and C-2 and a saturated linkage between C-1 and C-2.

2. The acetate of 6-methyl-Δ⁴,⁶,⁹⁽¹¹⁾-pregnatrien-17α-ol-3,20-dione.

3. The caproate of 6-methyl-Δ⁴,⁶,⁹⁽¹¹⁾-pregnatrien-17α-ol-3,20-dione.

4. The propionate of 6-methyl-Δ⁴,⁶,⁹⁽¹¹⁾-pregnatrien-17α-ol-3,20-dione.

5. The acetate of 6-methyl-Δ¹,⁴,⁶,⁹⁽¹¹⁾-pregnatetraen-17α-ol-3,20-dione.

6. The caproate of 6-methyl-Δ¹,⁴,⁶,⁹⁽¹¹⁾-pregnatetraen-17α-ol-3,20-dione.

References Cited in the file of this patent

UNITED STATES PATENTS

| | | |
|---|---|---|
| 2,837,464 | Nobile | June 3, 1958 |
| 2,867,637 | Lincoln et al. | Jan. 6, 1959 |
| 2,892,851 | Bergstrom et al. | June 30, 1959 |
| 2,894,008 | Sollman | July 7, 1959 |
| 2,963,498 | Bergstrom et al. | Dec. 6, 1960 |
| 3,038,914 | Magerlein et al. | June 12, 1962 |

OTHER REFERENCES

Selye: Textbook of Enrocrinology, Acta Endrocrinologica, Universite de Montreal, Montreal, Canada (1947), page 70.

Journal of Amer. Chem. Soc., volume 81, August 20, 1959, pages 4435–4436.

UNITED STATES PATENT OFFICE
CERTIFICATE OF CORRECTION

Patent No. 3,125,590                        March 17, 1964

Howard J. Ringold

It is hereby certified that error appears in the above numbered patent requiring correction and that the said Letters Patent should read as corrected below.

Column 1, lines 24 to 35, the right-hand formula should appear as shown below instead of as in the patent:

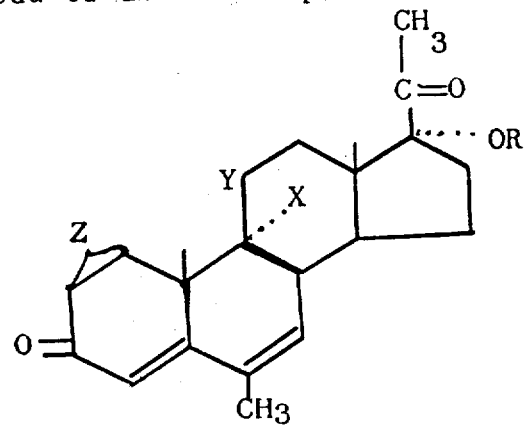

Column 2, lines 35 to 45, the right-hand formula should appear as shown below instead of as in the patent:

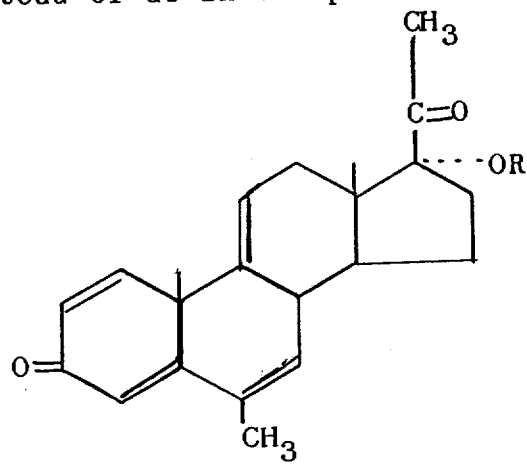

Signed and sealed this 14th day of July 1964.

(SEAL)
Attest:
ESTON G. JOHNSON
Attesting Officer

EDWARD J. BRENNER
Commissioner of Patents